US010181194B2

(12) United States Patent
Chen

(10) Patent No.: US 10,181,194 B2
(45) Date of Patent: Jan. 15, 2019

(54) PIXEL ACQUISITION CIRCUIT, OPTICAL FLOW SENSOR, AND IMAGE ACQUISITION SYSTEM

(71) Applicant: CelePixel Technology Co. Ltd, Shanghai (CN)

(72) Inventor: Shoushun Chen, Shenzhen (CN)

(73) Assignee: CELEPIXEL TECHNOLOGY CO. LTD, Shanghai (CN)

( * ) Notice: Subject to any disclaimer, the term of this patent is extended or adjusted under 35 U.S.C. 154(b) by 85 days.

(21) Appl. No.: 15/581,858

(22) Filed: Apr. 28, 2017

(65) Prior Publication Data

US 2018/0268553 A1    Sep. 20, 2018

(30) Foreign Application Priority Data

Mar. 17, 2017    (CN) .......................... 2017 1 0161456

(51) Int. Cl.

| G06T 7/20 | (2017.01) |
|---|---|
| H04N 5/232 | (2006.01) |
| H04N 5/353 | (2011.01) |
| H04N 5/376 | (2011.01) |
| H04N 5/378 | (2011.01) |
| H04N 5/3745 | (2011.01) |

(52) U.S. Cl.
CPC ............ G06T 7/20 (2013.01); H04N 5/23245 (2013.01); H04N 5/353 (2013.01); H04N 5/378 (2013.01); H04N 5/3765 (2013.01); H04N 5/37455 (2013.01); G06T 2207/10016 (2013.01); G06T 2207/30241 (2013.01)

(58) Field of Classification Search
CPC ............ G06T 7/20; G06T 2207/10016; G06T 2207/30241; H04N 5/23245; H04N 5/353; H04N 5/37455; H04N 5/3765; H04N 5/378
See application file for complete search history.

(56) References Cited

U.S. PATENT DOCUMENTS

| 9,846,972 | B2 * | 12/2017 | Montgomerie ....... G06T 19/006 |
|---|---|---|---|
| 2016/0063706 | A1 * | 3/2016 | Gonzalez-Banos ....... G06T 7/73 348/222.1 |
| 2017/0026595 | A1 * | 1/2017 | Chenebaux ....... H01L 27/14609 |
| 2017/0364094 | A1 * | 12/2017 | Yang .................... G03B 15/006 |
| 2018/0013969 | A1 * | 1/2018 | Chen ...................... H04N 5/374 |

* cited by examiner

Primary Examiner — Amy R Hsu
(74) Attorney, Agent, or Firm — IPro, PLLC; Na Xu

(57) ABSTRACT

The invention discloses a pixel acquisition circuit, an optical flow sensor, and an image acquisition system. Therein, the optical flow sensor comprises a pixel acquisition circuit array, a waveform generator, a global control unit, and a readout unit. The pixel acquisition circuit array comprises the pixel acquisition circuits in accordance with the invention. The waveform generator is operative to output a periodic signal waveform to the time signal line coupled with each of the pixel acquisition circuits in the array. The global control unit is operative to output said global activation signal to each pixel acquisition circuit through the global trigger signal line, and output a reset signal to each pixel acquisition circuit through said reset signal line. The readout unit is operative to read the signals output by at least a part of the pixel acquisition circuits in that array.

20 Claims, 12 Drawing Sheets

PIXEL ACQUISITION CIRCUIT, OPTICAL FLOW SENSOR, AND IMAGE ACQUISITION SYSTEM

CROSS-REFERENCE TO RELATED APPLICATION

This application claims priority from CN Patent Application Serial No. 201710161456X, filed on Mar. 17, 2017, the entire contents of which are incorporated herein by reference for all purposes.

TECHNICAL FIELD

The invention relates to the field of image acquisition techniques, and more particularly relates to a pixel acquisition circuit, an optical flow sensor, and an image acquisition system.

BACKGROUND

With the development of information technology, computer vision and image information processing are becoming more and more important. Therein, the moving status of a target object can be determined by an optical flow method based on image information. The optical flow method can be applied in a number of fields, such as military astronautics, traffic surveillance, information science, meteorology, and medicine, etc.

The concept of optical flow was first introduced by Gibson in 1950. A physical object can be imaged by photosensitive elements. Each point in the resulted image is in a one-to-one correspondence with a respective point on the physical object. When the target object is moving in a three-dimensional scene, the brightness patterns of the corresponding image frame sequence will exhibit certain relevant flows. Such flows of image brightness patterns can be referred to as optical flows.

At present, optical flow algorithms are normally rather complex and computation-intensive. In order to perform optical flow calculations, front-end image acquisition devices are required to capture images at a high frame rate, then subsequent image processing devices perform computation-intensive optical flow analysis.

The existing optical flow algorithms require multiple frames of image information at first, then perform optical flow analysis through a relative high intensity of computation. Therefore, the existing optical flow analysis devices have a high requirement on data processing capabilities, and need improvement in real-timeness.

Therefore, the invention proposes a new scheme for optical flow acquisition.

SUMMARY

The invention provides a new technical scheme to acquire the optical flow information, thus effectively solving at least one of the above-mentioned problems.

In accordance with an aspect of the invention, a pixel acquisition circuit of an optical flow sensor is provided, which comprises a photodetection unit, a signal detection unit, an OR logic unit, an acquisition control unit, a sample and hold unit, and a signal output unit. The photodetection unit is operative to output a first electrical signal corresponding to the light signal illuminating thereon in real time. The signal detection unit, with its input terminal coupled with the output terminal of the photodetection unit, is operative to output a first trigger signal the moment when the first electrical signal meets predetermined trigger conditions. The OR logic unit, with its input terminal coupled with both the output terminal of the signal detection unit and a global trigger signal line of the optical flow sensor, is operative to output an acquisition instruction signal when receiving the first trigger signal or a global trigger signal from the global trigger signal line. The acquisition control unit, with its input terminal coupled with the output terminal of the OR logic unit, is operative to generate and keep an activation signal when receiving the acquisition instruction signal. The sample and hold unit, with its first input terminal coupled with the output terminal of the photodetection unit, its second input terminal coupled with a time signal line, and its third input terminal coupled with the output terminal of the acquisition control unit, is operative to receive the activation signal, and sample and buffer the first electrical signal and/or time signal at the moment of the receiving of the activation signal. The signal output unit, being coupled with both the acquisition control unit and the sample and hold unit, is operative to buffer and output the activation signal, the first electrical signal and/or time signal most recently sampled by the sample and hold unit.

In accordance with another aspect of the invention, an optical flow sensor is provided, which comprises a pixel acquisition circuit array, a waveform generator, a global control unit, and a readout unit. The pixel acquisition circuit array comprises the pixel acquisition circuits in accordance with the invention. The waveform generator is operative to output a periodic signal waveform to the time signal line coupled with each of the pixel acquisition circuits in the array. The global control unit is operative to output a global trigger signal and a reset signal to the whole pixel acquisition circuit array through the coupled global trigger signal line and reset signal line respectively. The readout unit is operative to read the signals output by at least a part of the pixel acquisition circuits in that array.

In accordance with another aspect of the invention, an image acquisition system is provided, which comprises an optical flow sensor in accordance with the invention, an optical flow pre-processor, and an image pre-processor. The image pre-processor is operative to receive information from the optical flow sensor under image mode. The optical flow pre-processor is operative to receive information from the optical flow sensor under optical flow mode.

In summary, the optical flow sensor in accordance with the invention can instruct the pixel acquisition circuit array to operate under image mode or optical flow mode through the global control unit. Under image mode, the pixel acquisition circuit array acquires a full image. Especially in some application scenarios demanding high-speed photography, the optical flow sensor in accordance with the invention is capable of capturing sharp and lag-free images thanks to the elimination of the exposure time. In this way, images acquired by the optical flow sensor can provide full background information for subsequent optical flow frames. Under optical flow mode, each pixel acquisition circuit responds to its local light intensity and determines whether to be activated based on the detected light intensity change. In this way, the pixel acquisition circuits of the invention can individually acquire a time signal relating to the optical flow information of a moving object, that is, to acquire an optical flow frame. On this basis, the motion trajectory of a target object can be fully characterized by multiple frames of time signals and corresponding address information acquired by the optical flow sensor of the invention. In summary, the optical flow sensor of the invention can provide clear and straightforward optical flow information, thus greatly reducing redundant information, and furthermore can reduce the computational complexity of subsequent optical flow algorithms and thus reduce latency in real-time applications of the optical flow algorithm.

BRIEF DESCRIPTION OF THE DRAWINGS

In order to accomplish the foregoing and related objects, certain illustrative aspects will be described hereby in connection with the following description and drawings, these aspects indicating the various ways in which the principles disclosed herein can be practiced, and all the aspects and equivalents thereto are intended to fall into the scope of the claimed subject matter. Through reading the following detailed description in conjunction with the drawings, the foregoing and other objects, features, and advantages of the disclosure will become more apparent. The same parts or elements are generally denoted with the same reference numbers throughout the disclosure.

DETAILED DESCRIPTION

Figure 1:
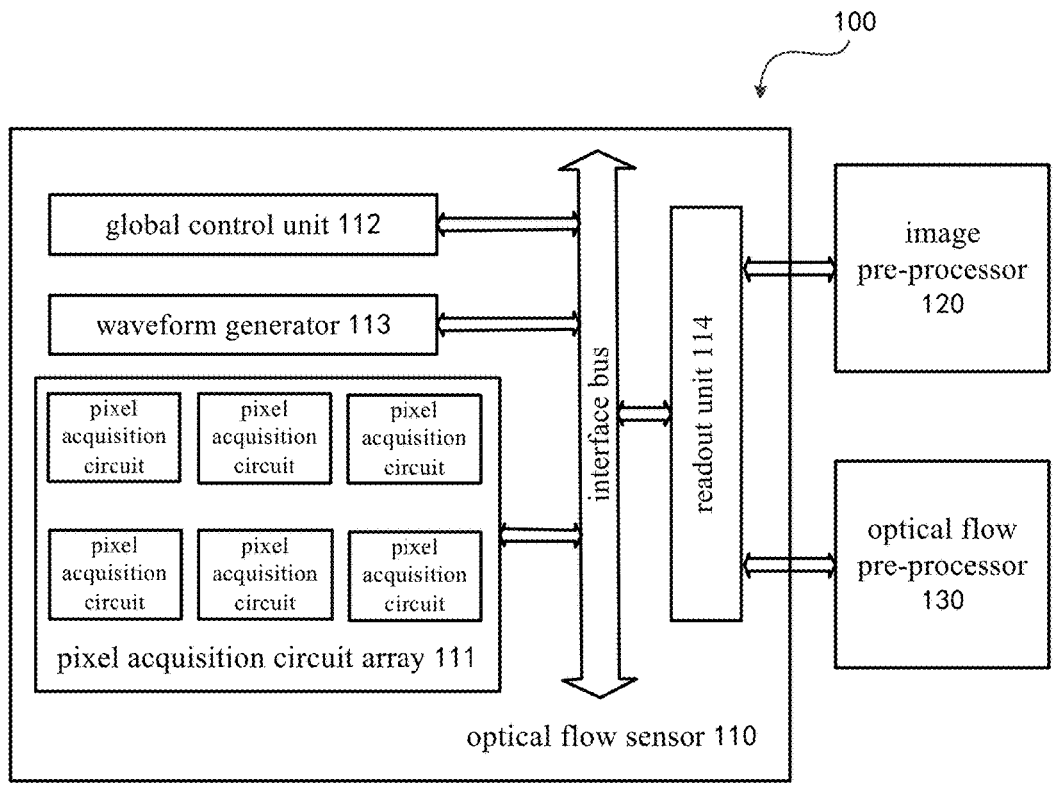
FIG. 1 shows a schematic diagram of an image acquisition system 100 in accordance with some embodiments of the invention.

Exemplary embodiments of the disclosure will now be described in more details in conjunction with the drawings.

Although exemplary embodiments of the disclosure are shown in the drawings, it should be understood that the disclosure can be implemented in various ways without being restricted to the embodiments set forth herein. On the contrary, these embodiments are provided for understanding the disclosure more thoroughly, and for being able to fully convey the scope of the disclosure to those skilled in the art.

FIG. 1 shows a schematic diagram of an image acquisition system 100 in accordance with some embodiments of the invention. As shown in FIG. 1, the image acquisition system 100 comprises an optical flow sensor 110, an image pre-processor 120, and an optical flow pre-processor 130. The optical flow sensor 110 comprises a pixel acquisition circuit array 111, a global control unit 112, a waveform generator 113 and a readout unit 114. Herein, the array 111 is coupled to the global control unit 112, the waveform generator 113 and the readout unit 114 together.

It should first be noted that the existing image sensors normally generate a series of images (frames) in a certain frequency. Each frame is a full image within the image sensor's field of view. In terms of the information acquisition, the existing image sensors work at fixed intensity mode. In contrast to the prior techniques, the optical flow sensor 110 is more flexible, which means it could work in different operation modes. In particular, the optical flow sensor 110 of the invention can configure its operation mode in different time slices. The optical flow sensor 110 can independently configure its operation mode in each time period. There are two operation modes in total, i.e., optical flow mode and image mode.

In each time period under image mode, the global control unit 112 can instruct all the pixel acquisition circuits (i.e., pixel units) in the pixel acquisition circuit array 111 to synchronously acquire an electrical signal relating to the light intensity information. In other words, the global control unit 112 can globally activate the pixel acquisition circuit array 111 and acquire the electrical signal relating to a complete image. On this basis, the readout unit 114 can read the electrical signal relating to a complete image, and transmit it to the image pre-processor 120. The image pre-processor 120 can be configured to perform amplification and analog-digital conversion on the obtained electrical signals in order to obtain a digital image. Briefly speaking, the optical flow sensor 110 acquires an image frame in each time period under image mode.

In each time period under optical flow mode, the global control unit 112, by itself, does not activate the pixel acquisition circuits. The waveform generator 113 is operative to provide a periodic waveform signal to each pixel acquisition circuit. The periodic waveform signal could be, for example, a triangular wave, a sawtooth wave, or a sine wave, etc., but not limited thereto. Each pixel acquisition circuit in the array 111 continuously monitors the information of light intensity illuminating thereon in real time. When a pixel acquisition circuit detects that the change of the light intensity information meets predetermined conditions (for example, both the amount and rate of illuminance change exceed respective thresholds), it can turn into activated state in real time. Meanwhile, the pixel acquisition circuit can acquire the instantaneous voltage amplitude of the periodic signal waveform at the current phase as the time signal, or also an electrical signal corresponding to the current light intensity information. On this basis, the readout unit 114 can read the addresses and sampled time signals of the activated (triggered) pixel acquisition circuits. The information read by the readout unit 114 can be referred to as an optical flow frame. The readout unit 114 can transmit the optical flow frame to the optical flow pre-processor 130. The optical flow pre-processor 130 can perform operations such as analog-digital conversion on the time signals in the optical flow frame.

In summary, based on different configurations of basic operation modes in different time periods, the optical flow sensor 110 is versatile in operation time sequences. This could be illustrated by way of an example in conjunction with FIGS. 2A, 2B, 2C, and 2D. To simplify the description, each time period in an operation time sequence will be referred to as a frame hereinafter.

Figure 2A:
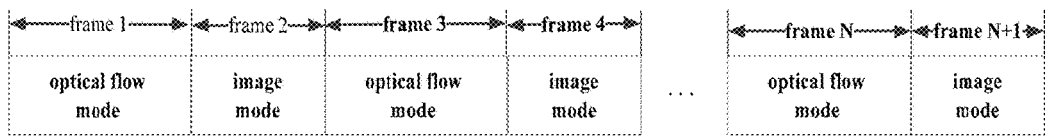
FIGS. 2A, 2B, 2C, and 2D respectively shows an embodiment of the concrete operation time sequence of an optical flow sensor in accordance with the invention.

In the embodiment shown in FIG. 2A, the optical flow sensor 110 works at optical flow mode in frame 1, image mode in frame 2, optical flow mode in frame 3, image mode in frame 4, and so forth. The optical flow sensor 110 switches mode once after each frame, thus operating alternately under optical flow mode and image mode. This operation time sequence is usually applied in the scenario of tracking the trajectory of a moving object. The image frames acquired by the optical flow sensor 110 under image mode provide full background information of the moving object. The optical flow frames acquired by the optical flow sensor 110 under optical flow mode provide the time and space information of when and where the motion is detected in this frame.

Figure 2B:
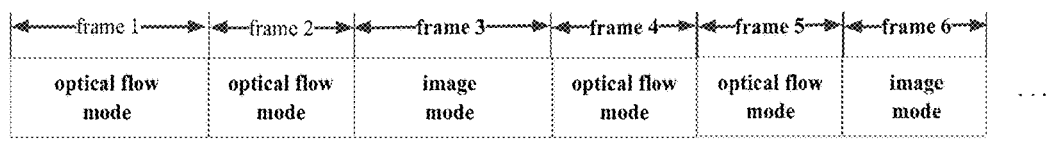

In the embodiment shown in FIG. 2B, the optical flow sensor 110 is in optical flow mode in frames 1 and 2, in image mode in frame 3, in optical flow mode in frames 4 and 5, in image mode in frame 6, and so forth. After every 2 frames in optical flow mode, the optical flow sensor 110 is in image mode for 1 frame.

Figure 2C:
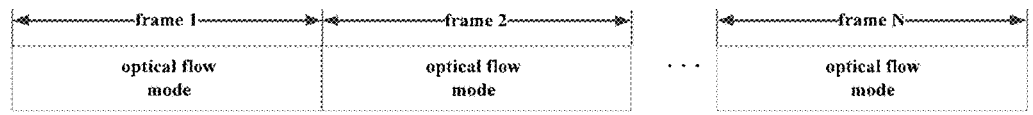

In the embodiment shown in FIG. 2C, the optical flow sensor 110 is under optical flow mode in each frame.

Figure 2D:
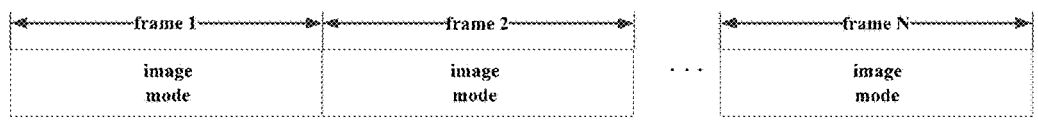

In the embodiment shown in FIG. 2D, the optical flow sensor 110 is under image mode in each frame.

It should be noticed that the operation time sequence of the optical flow sensor 110 of the invention can also be configured in alternative but equivalent ways other than the examples presented above, which will not be elaborated herein.

To explain more figuratively the operating process of the optical flow sensor, taking FIGS. 3A, 3B, and 3C for examples, the operating process of the optical flow sensor 110 configured as shown in FIG. 2C will be set forth below.

Figure 3A:
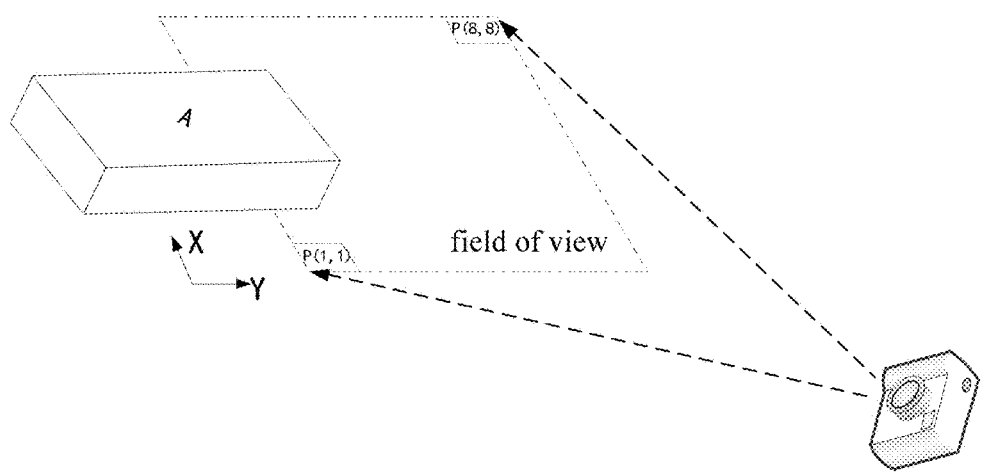
FIG. 3A shows an application scenario of an embodiment of the optical flow sensor in accordance with the invention.
Figure 3B:
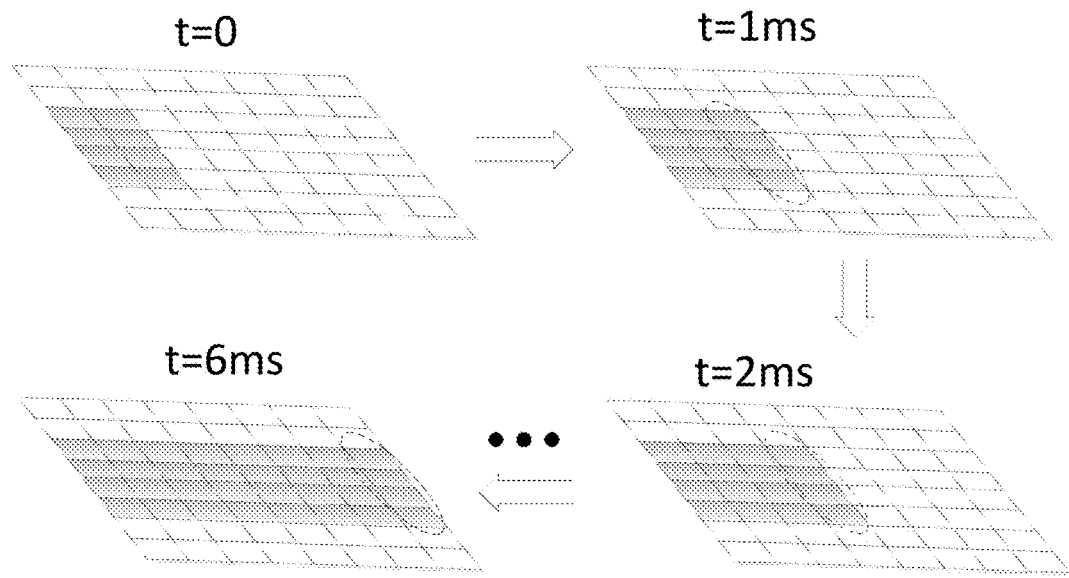
FIG. 3B shows a diagram indicating the locations of a moving object A in the field of view at the time instants t=0 ms, 1 ms, 2 ms and 6 ms, respectively.
Figure 3C:
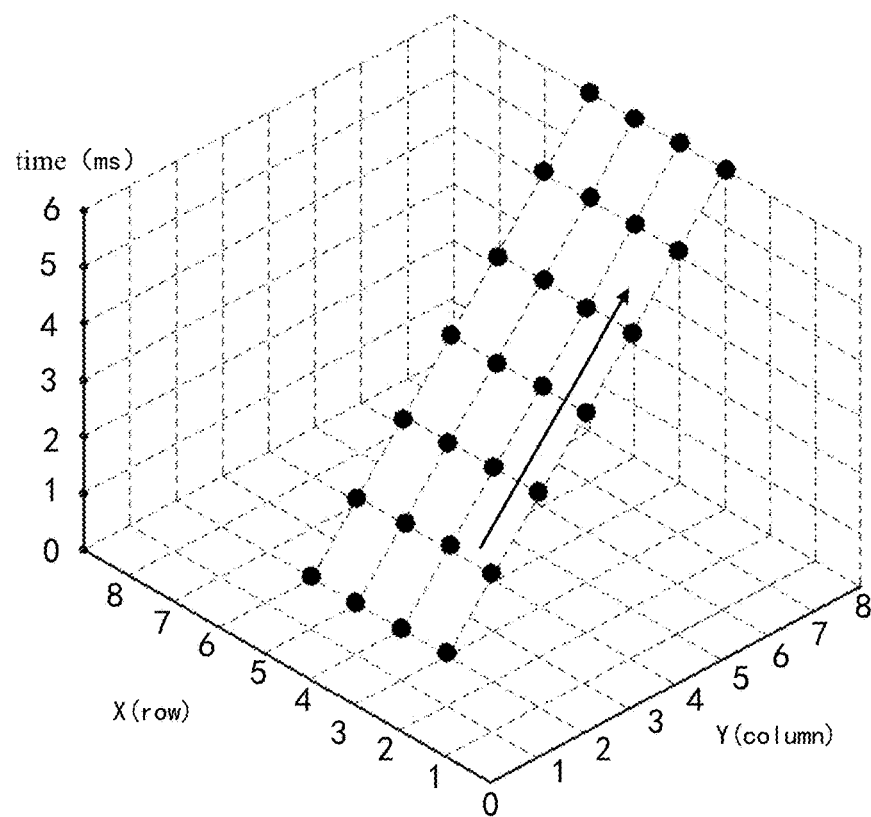
FIG. 3C shows a diagram of mappings between the time signals and addresses obtained by an optical flow pre-processor in the application scenario shown in FIG. 3A.

FIG. 3A shows a typical application scenario of the optical flow sensor 110 of the invention. As shown in FIG. 3A, a moving object A enters the field of view of the optical flow sensor 110 at constant speed in the direction along the Y axis. To simplify the description, the optical flow sensor 110 is configured including an 8×8 pixel acquisition circuit array 111. Accordingly, the field of view corresponding to the array 111 can be divided into an 8×8 grid-like area. Furthermore, the grid cell in row x and column y is denoted with P(x,y). In FIG. 3A, the x (row) coordinate increases from bottom to top, and the y (column) coordinate increases from left to right. Each grid cell is in one-to-one correspondence with a respective pixel acquisition circuit. FIG. 3B shows a diagram of the locations of the moving object A in the field of view at time instants t=0 ms, 1 ms, 2 ms and 6 ms, respectively. Therein, the grid cells not covered by the moving object A in the field of view are shown in white, and the grid cells covered by the moving object A are shown in grey. The 4 time instants described above in turn correspond to 4 frames of the optical flow sensor 110 (as described above, each frame is an acquisition time period). Here, the light intensity of the moving object A differs much from that of the background. When the moving object A is passing a white background grid cell, the corresponding pixel acquisition circuit can detect the relevant light intensity change meets predetermined conditions, then turn into activated state immediately, and sample the instantaneous time signal.

At the time instant t=0 ms, the pixel acquisition circuits corresponding to P(3,1) to P(6,2), a total of 8 grid cells, go into activated state and acquire time signals. The readout unit 114 can read the corresponding optical flow frame.

At the time instant t=1 ms, the pixel acquisition circuits corresponding to P(3,3) to P(6,3), a total of 4 grid cells, acquire time signals in this frame. Whereas the light intensity information corresponding to the grid cells P(3,1) to P(6,2) does not change much, therefore the corresponding pixel acquisition circuits are not activated in this frame. The same analysis holds for the subsequent time instants t=2 ms and 6 ms, which will not be elaborated herein.

For the 4 time instants described above (t=0 ms, 1 ms, 2 ms, and 6 ms), the optical flow sensor 110 can acquire 4 optical flow frames. Based on these 4 optical flow frames, the optical flow pre-processor 130 (or other optical flow analysis devices) can determine the speed and direction information of the moving object (in fact, the projection of the moving object to a plane perpendicular to the camera). FIG. 3C shows such a diagram of mappings in terms of the time signals and corresponding pixel addresses obtained by the optical flow pre-processor the application scenario shown in FIG. 3A. This diagram of mappings can be referred to as a time slope image. Therein, the X axis and Y axis respectively represent the rows and columns of the pixel acquisition circuit array 111, and the Z axis represents time signals. The gradient of the time slope in FIG. 3C can characterize the speed of the moving object. The aspect (the direction of the arrow in the drawing) of the time slope in FIG. 3C can be used to analyze the moving direction information of the moving object.

Figure 3D:
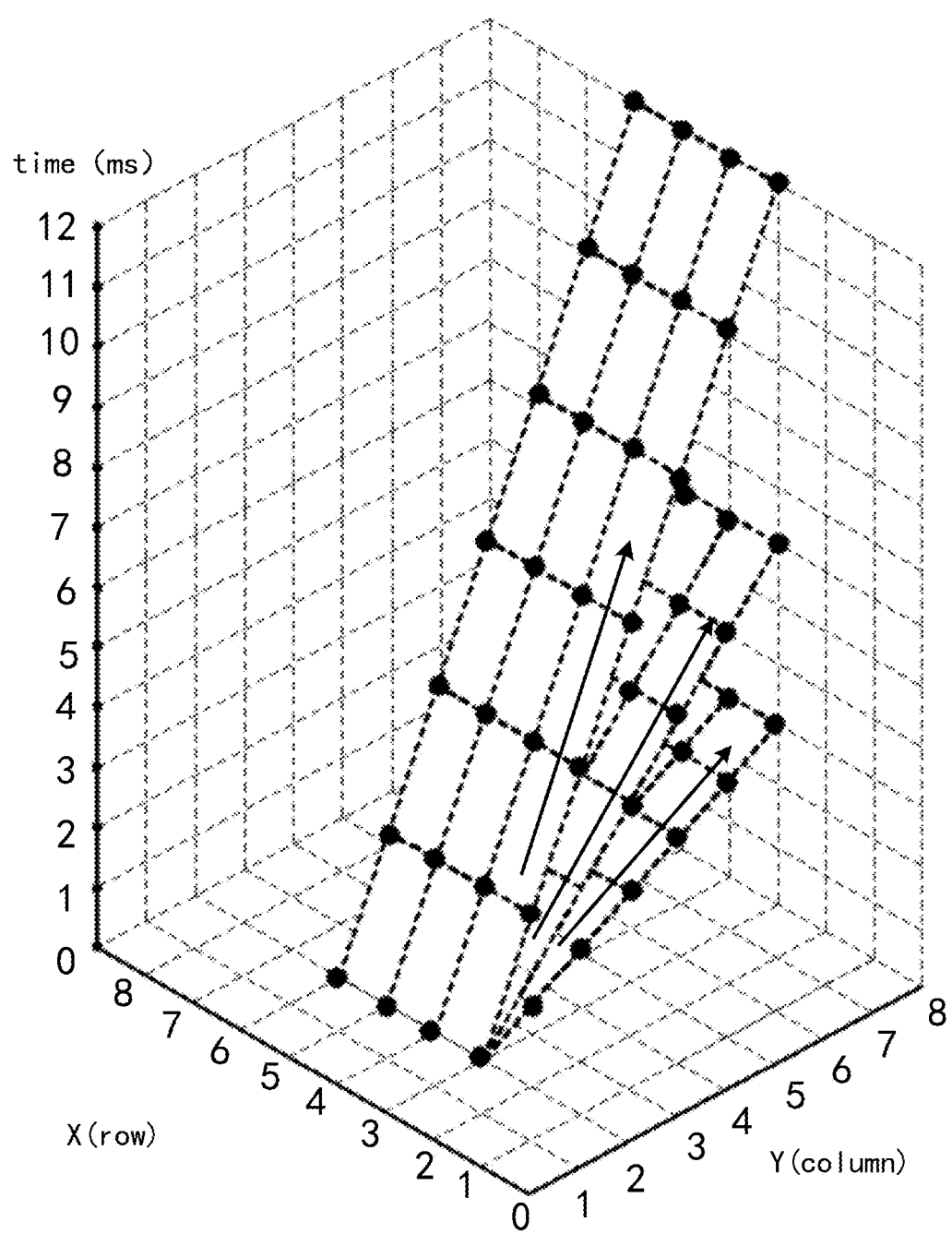
FIG. 3D shows a time slope image formed when the moving object A passes the field of view in the same direction (the Y direction) but at different moving speeds.
Figure 3E:
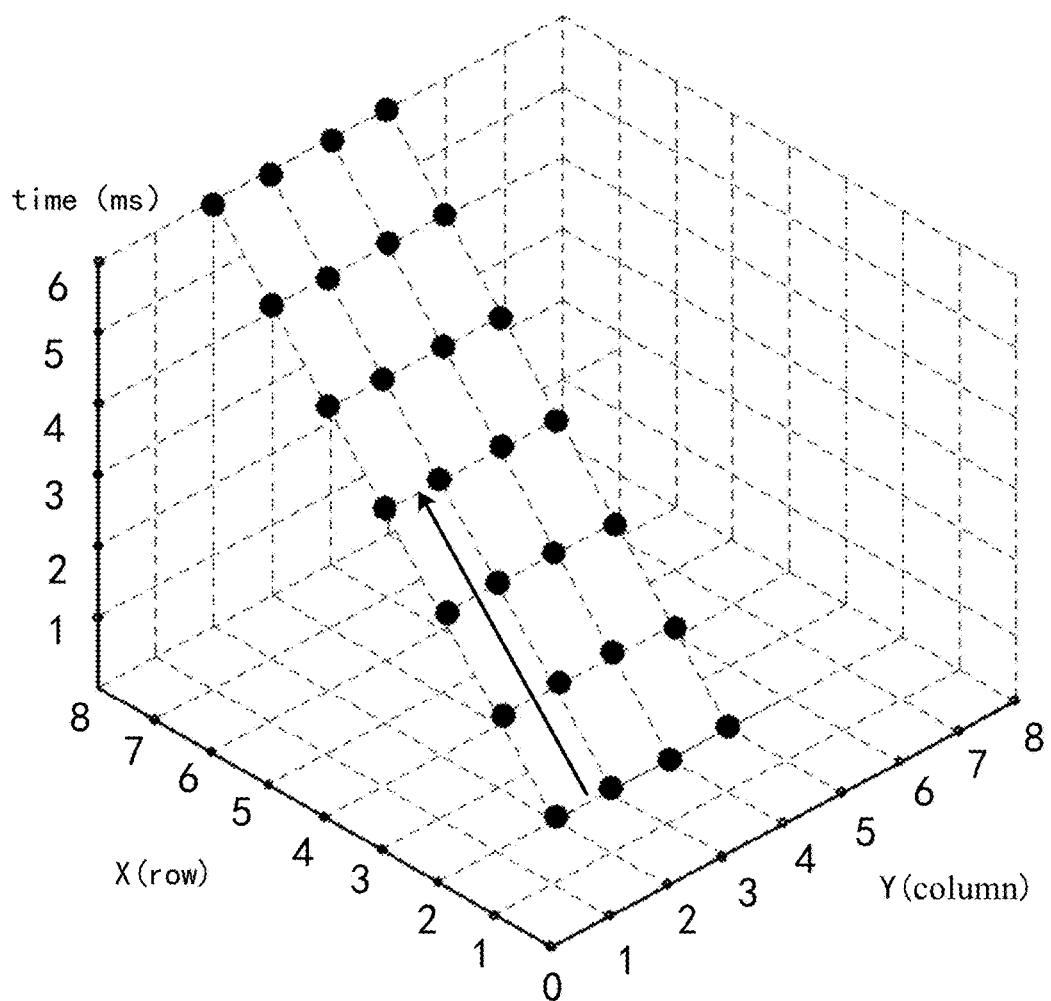
FIGS. 3E and 3F respectively shows a time slope image in which the moving object A moves along the X direction and the direction with 45° clockwise from the X direction, respectively.
Figure 3F:
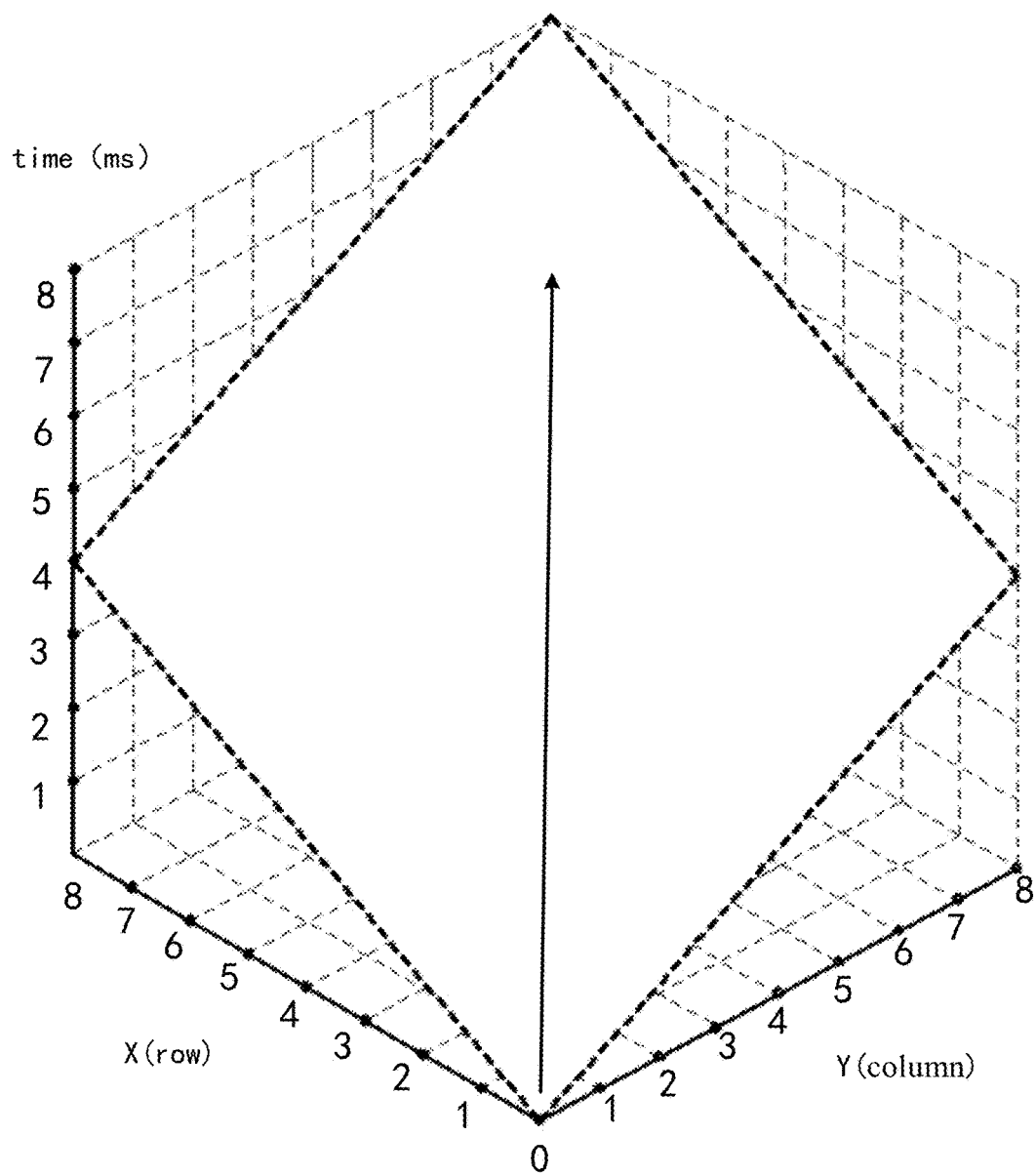

FIG. 3D shows a time slope image formed when the moving object passes the field of view in the same direction (the Y direction) but at different moving speeds. Since moving in the same direction, the aspects of the three time slopes are consistent with each other. However, the time slopes have different gradients due to different speeds. The three time slopes, in order of decreasing gradients, corresponds respectively to the speeds of 0.5 pixels per millisecond, 1 pixel per millisecond, and 2 pixels per millisecond. Thus it can be seen that the slower the object moves, the steeper the resulted time slope is. In contrast, the faster the object moves, the flatter the resulted time slope is. FIGS. 3E and 3F respectively shows the time slope mappings formed by the target object A moving along the X direction and the direction of 45° clockwise from the X direction. By projecting the aspect (the vector) of the time slope in the respective drawing onto the XY plane, the moving direction of the object can be obtained conveniently.

As described above, the pixel acquisition circuit array 110 of the invention supports both optical flow and image operation mode. The pixel acquisition circuits in the array 110 will be further elaborated below in conjunction with FIG. 4, which shows a schematic diagram of the pixel acquisition circuit 400 in accordance with some embodiments of the invention.

Figure 4:
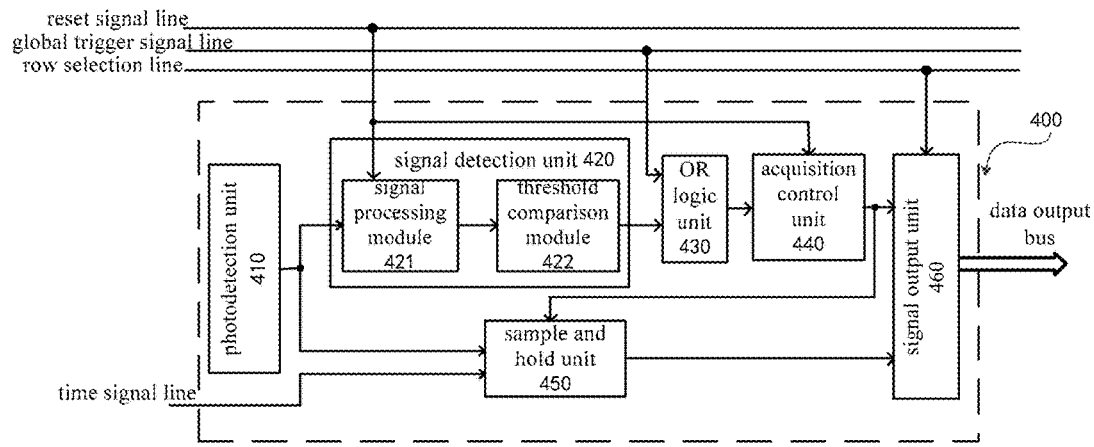
FIG. 4 shows a schematic diagram of a pixel acquisition circuit 400 in accordance with some embodiments of the invention.

As shown in FIG. 4, the pixel acquisition circuit 400 comprises a photodetection unit 410, a signal detection unit 420, an OR logic unit 430, an acquisition control unit 440, a sample and hold unit 450, and a signal output unit 460.

The photodetection unit 410 is operative to output a first electrical signal responding to the light signal illuminating thereon in real time. Here, the photodetection unit 410 can be but not limited to, for example, a variety of logarithmic photodetectors. FIGS. 5A, 5B, 5C, and 5D respectively show a schematic diagram of a photodetection unit in accordance with an embodiment of the invention.

Figures 5A, 5B, 5C, 5D:
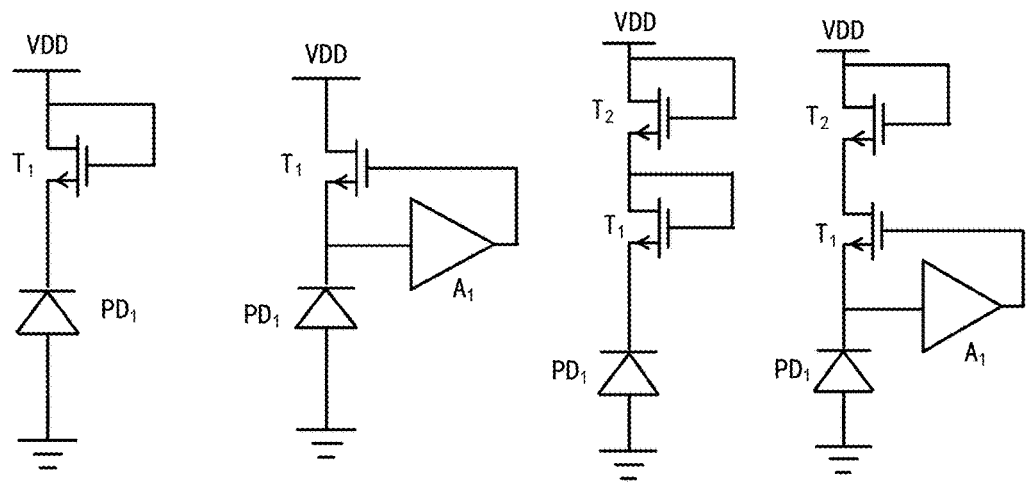
FIGS. 5A, 5B, 5C, and 5D respectively shows a schematic diagram of a photodetection unit in accordance with an embodiment of the invention.

In the embodiment shown in FIG. 5A, the photodetection unit comprises a photodiode $PD_1$ with its anode grounded and a first transistor $T_1$. The first transistor $T_1$ has its source connected with the cathode of the photodiode $PD_1$ and its drain and gate connected to the power supply VDD. In an application scenario, the photodiode $PD_1$ receives an illumination signal, and then generates a photocurrent I in proportional to the incident light intensity. On this basis, the voltage difference between the source and gate of $T_1$ has a linear correlation with 1 nI. In other words, the first electrical signal output by the photodetection unit in this embodiment has a logarithmic relation with the intensity of the illumination light signal.

In the embodiment shown in FIG. 5B, the photodetection unit comprises a photodiode $PD_1$ with its anode grounded, a first transistor $T_1$, and a first amplifier $A_1$. The first transistor $T_1$ has its source connected with the cathode of the photodiode $PD_1$ and its drain connected with the power supply VDD. The first amplifier $A_1$ is connected between the cathode of the photodiode $PD_1$ and the gate of the first transistor $T_1$. Here, $A_1$ can increase the response speed of the voltage difference between the source and gate of $T_1$. In other words, $A_1$ increases the response speed of the pixel acquisition circuit to the change of light intensity.

In the embodiment shown in FIG. 5C, the photodetection unit comprises a photodiode $PD_1$ with its anode grounded and N transistors connected in series. The number N in FIG. 5C is 2 but not limited thereto. As for the N transistors connected in series, the source of the 1st transistor is connected with the cathode of the photodiode $PD_1$. The drain of the Nth transistor is connected to the power supply VDD, each transistor has its gate and drain connected together, and the source of each of the 2nd to the Nth transistors is connected to the drain of the previous transistor. Here, the N transistors connected in series can increase the current (voltage) gain of the photodetector. Depending on the expectation of that gain, N can also be configured as any integer value greater than 2.

In the embodiment shown in FIG. 5D, the photodetection unit comprises a photodiode $PD_1$ with its anode grounded, N transistors connected in series, and a first amplifier $A_1$. In FIG. 5D, N is 2, and can also be an integer value greater than 2. The first amplifier $A_1$ is connected between the cathode of the photodiode $PD_1$ and the gate of the 1st transistor. The source of the 1st transistor is connected with the cathode of the photodiode $PD_1$. The drain of the Nth transistor is connected to the power supply VDD. The source of each of the 2nd to the Nth transistors is connected to the drain of the previous transistor, and each of the 2nd to the Nth transistors has its gate and drain connected together.

Apart from the several above-mentioned embodiments of the photodetection unit, the invention can also employ a variety of well-known continuous-time photodetection units, which will not be elaborated here. What needs to be explained is that the traditional photodetection techniques generally require the process of resetting a capacitor, and then conducting continuous exposure operation (continuous discharge of the capacitor), and then determining the accumulated illumination intensity according to the remaining charge of the capacitor. The photodetection unit 410 in accordance with the invention does not require extra exposure time in generating the light-intensity-related first electrical signal. Therefore, the photodetection unit 410 can output the first electrical signal with no delay.

The input terminal of the signal detection unit 420 is coupled with the output terminal of the photodetection unit 410. The signal detection unit 420 is operative to output a first trigger signal when detecting the first electrical signal meets predetermined trigger conditions. Here, the predetermined trigger conditions are that the change of light intensity information is both of enough speed and of enough strength. The change of light intensity satisfying this condition can be considered as being caused by valid motion of the target object. On the other hand, the change of light intensity that is of low speed or of low strength is usually caused by drift or jitter of the background light intensity.

The signal detection unit 420 comprises a signal processing module 421 and a threshold comparison module 422. The signal processing module 421 can perform pre-processing on the first electrical signal. In an embodiment, the signal processing module 421 can perform a high-pass filtering process on the first electrical signal in order to filter out the low frequency component in the first electrical signal (i.e., to filter out the light intensity information with low rate of change). In another embodiment, aside from the high-pass filtering process, the signal processing module 421 can also perform an amplification process on the first electrical signal. The amplification process can increase the sensitivity of the pixel acquisition circuit in detecting light intensity change. The signal processing module 421 can employ a variety of well-known filtering and amplification techniques but not limited thereto. FIGS. 6A, 6B, 6C, and 6D respectively shows a schematic diagram of a signal processing module in accordance with an embodiment of the invention.

Figure 6A:
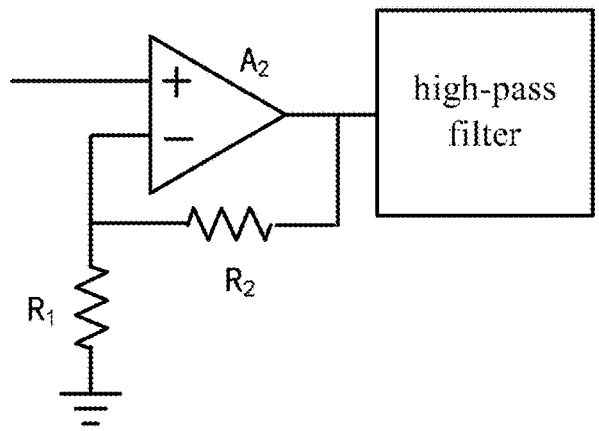
FIGS. 6A, 6B, 6C, and 6D respectively shows a schematic diagram of a signal processing module in accordance with and embodiment of the invention.

In the embodiment shown in FIG. 6A, the signal processing module 421 comprises a second amplifier $A_2$ and a high-pass filter. The second amplifier $A_2$ has its positive input electrode connected with the output terminal of the photodetection unit, and its negative input electrode connected with a first resistor $R_1$ which acts as a pull-down resistor, and a second resistor ($R_2$) is connected across the output terminal and negative input electrode of the second amplifier $A_2$. The second amplifier $A_2$ is operative to perform an amplification process on the first electrical signal output by the photodetection unit. The high-pass filter connected with the second amplifier $A_2$ removes the signal component below a frequency threshold from the amplified first electrical signal, and outputs a second electrical signal.

Figure 6B:
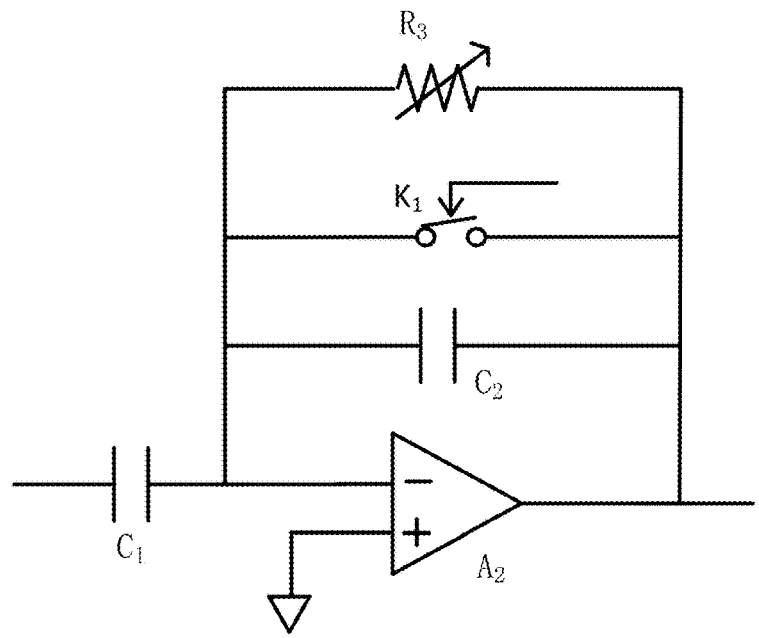

In the embodiment shown in FIG. 6B, the signal processing module comprises a first capacitor $C_1$, a second amplifier $A_2$, a second capacitor $C_2$, a third resistor $R_3$, and a first switch $K_1$. The first terminal of the first capacitor $C_1$ is connected with the output terminal of the photodetection unit. The negative input electrode of the second amplifier $A_2$ is connected with the second terminal of the first capacitor $C_1$. The second capacitor $C_2$, the third resistor $R_3$, and the first switch $K_1$ are all connected in parallel across the negative input electrode and output terminal of the second amplifier $A_2$. Therein, while the reset signal line holds the reset signal, the first switch $K_1$ is switched on. In this embodiment, the first capacitor $C_1$ can isolate the direct current component of the first electrical signal. The ratio of the first capacitor $C_1$ to the second capacitor $C_2$ is the gain of the signal processing module. In addition, the second capacitor $C_2$ and the third resistor $R_3$ form a high-pass filter. This filter can filter out the signal component below a frequency threshold in the alternating current component of the first electrical signal. Here, the threshold depends upon the resistance of the third resistor $R_3$. The third resistor $R_3$ can be configured as an adjustable resistor, whose resistance can, for instance, be adjusted through an instruction signal from the image acquisition system via the global control unit. That instruction signal can be determined according to user input but not limited thereto.

Figure 6C:
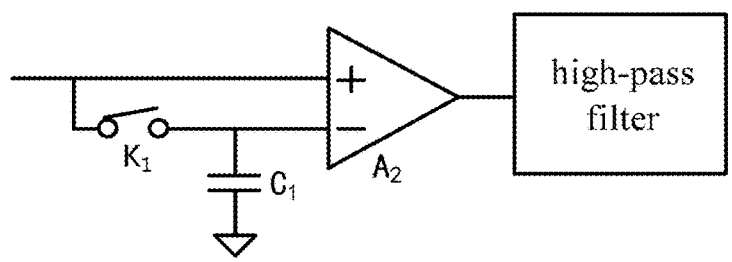

In the embodiment shown in FIG. 6C, the signal processing module 421 comprises a first capacitor $C_1$, a first switch $K_1$, a second amplifier $A_2$, and a high-pass filter. The positive input electrode of the second amplifier $A_2$ is connected with the output terminal of the photodetection unit. The first capacitor $C_1$ has its first terminal connected with the negative input electrode of the second amplifier $A_2$ and its second terminal connected to a fixed potential. That fixed potential could be ground potential but not limited thereto. The first switch $K_1$ is connected between the first terminal of the first capacitor $C_1$ and the output terminal of the photodetection unit. The high-pass filter connected with that second amplifier $A_2$ is operative to filter out the signal component below a predetermined frequency threshold in the amplified first electrical signal, and generate a second electrical signal. Therein, while the reset signal line holds the reset signal, the first switch $K_1$ turns on. After the reset signal is revoked, the first switch $K_1$ turns off, and the capacitor $C_1$ samples the instantaneous first electrical signal. The second amplifier $A_2$ can amplify the differential signal between the first electrical signal and the voltage sampled by the capacitor $C_1$. The high-pass filter can filter out the signal component below a frequency threshold in the differential signal amplified by the second amplifier $A_2$, and output the second electrical signal.

Figure 6D:
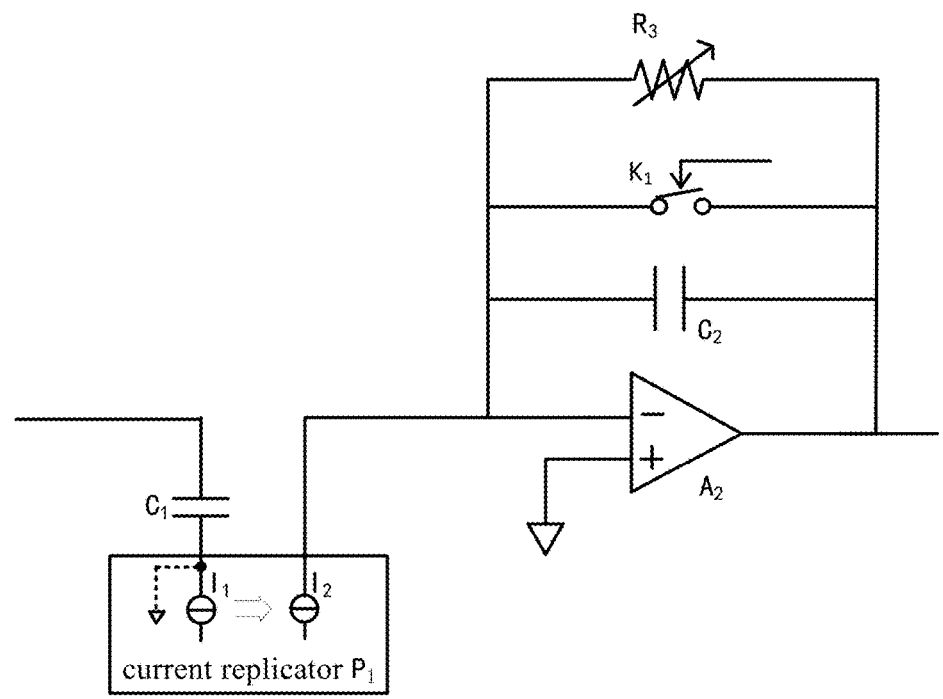

The embodiments shown in FIGS. 6A, 6B, and 6C are to perform amplification and filtering operations on the relative change of the first electrical signal. In addition, the signal processing module can achieve light intensity change detection by directly detecting the rate of change of the first electrical signal. FIG. 6D shows such an embodiment. In that embodiment, the signal processing module comprises a first capacitor $C_1$, a first switch $K_1$, a second amplifier $A_2$, a third adjustable resistor $R_3$, a second capacitor $C_2$, and a current replicator $P_1$. The first capacitor $C_1$ has its first terminal connected with the output terminal of the photodetection unit and its second terminal connected with the first terminal of the current replicator $P_1$. The second terminal of the current replicator $P_1$ is connected with the negative input electrode of the second amplifier $A_2$. The positive input electrode of the second amplifier $A_2$ is connected to a fixed potential. The second capacitor $C_2$, the third resistor $R_3$, and the first switch $K_1$ are all connected in parallel across the negative input electrode and output terminal of the second amplifier $A_2$. The first terminal and second terminal of the current replicator $P_1$ are respectively connected with a first current source $I_1$ and a second current source $I_2$. The current replicator has its first terminal clamped to a fixed potential, and replicates the current of the first capacitor $C_1$ to the second current source $I_2$ via the first current source $I_1$. The current replicator $P_1$ can be implemented according to a variety of well-known techniques, which will not be elaborated here. The first capacitor $C_1$ has its one terminal connected with the first electrical signal output by the photodetection unit and the other terminal connected with the first terminal of the current replicator $P_1$. According to the capacitor's voltage and current relationship, the current of the first capacitor $C_1$ is in direct proportion to the rate of change of the first electrical signal. This current is replicated via the current source $I_1$ to the current source $I_2$ to charge/discharge the second capacitor $C_2$, which finally results in a second electrical signal. On this basis, the amplitude of the second electrical signal is determined by the speed (the magnitude of the charging/discharging current $I_2$) and the duration of change (the duration of the charging/discharging current $I_2$) of the first electrical signal. Only the first electrical signal with enough duration of high speed of change can generate a large magnitude of the second electrical signal. In addition, the third resistor $R_3$ acts as a leakage resistor, which cancels out the charging/discharging effect of the second current source $I_2$ on the second capacitor $C_2$ when the second current source $I_2$ is too small. This removes the signal component below a frequency threshold in the alternating current component of the first electrical signal and implementing high-pass filtering. In addition, while the reset signal line holds the reset signal, the first switch $K_1$ turns on.

The threshold comparison module 422 has its input terminal coupled with the output terminal of the signal processing module 421, and can determine the magnitude of the first electrical signal having been processed by the signal processing module 421 (i.e., the second electrical signal). Once detecting the second electrical signal is greater than a first threshold or less than a second threshold, the threshold comparison module 422 outputs a first trigger signal to the OR logic unit 430.

Depending on the desired configuration, the threshold comparison module 422 can just determine whether the second electrical signal is greater than the first threshold or not. In another example, the threshold comparison module 422 is configured to just determine whether the second electrical signal is less than the second threshold or not. In yet another example, the threshold comparison module 422 is configured to determine both whether the second electrical signal is less than the second threshold and greater than the first threshold. Therein, the second threshold is less than the first threshold. In this way, the threshold comparison module 422 in accordance with the invention can detect whether the amount of change of the illumination intensity of the pixel acquisition circuit is significant enough (the illumination intensity can either increase or decrease). FIGS. 7A, 7B, 7C, and 7D respectively show a schematic diagram of a threshold comparison module in accordance with an embodiment of the invention.

Figure 7A:
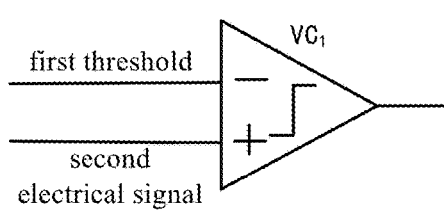
FIGS. 7A, 7B, 7C, and 7D respectively shows a schematic diagram of a threshold comparison module in accordance with an embodiment of the invention.

In the embodiment shown in FIG. 7A, the threshold comparison module 422 comprises a first voltage comparator $VC_1$. The first voltage comparator $VC_1$ has its inverting input terminal connected with the signal line providing a first threshold, and its non-inverting input terminal connected to the output terminal of the signal processing module. In this way, the threshold comparison module of this embodiment can determine whether the second electrical signal is greater than the first threshold.

Figure 7B:
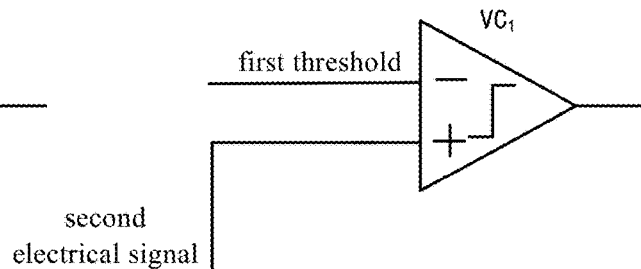
Figure 7B:
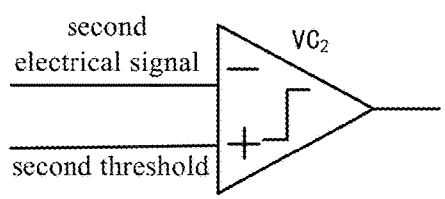

In the embodiment shown in FIG. 7B, the threshold comparison module 422 comprises a second voltage comparator $VC_2$. The second voltage comparator $VC_2$ has its non-inverting input terminal connected with the signal line providing a second threshold, and its inverting input terminal connected to the output terminal of the signal processing module. In this way, the threshold comparison module of this embodiment can determine whether the second electrical signal is less than the first threshold.

Figure 7C:
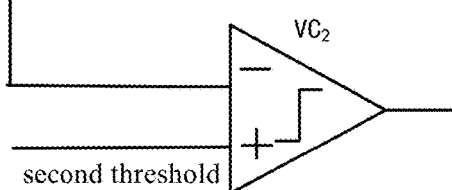

In the embodiment shown in FIG. 7C, the threshold comparison module 422 comprises a first voltage comparator $VC_1$ and a second voltage comparator $VC_2$. The first voltage comparator $VC_1$ has its inverting input terminal connected with the signal line providing a first threshold, and its non-inverting input terminal connected to the output terminal of the signal processing module 421. The second voltage comparator $VC_2$ has its non-inverting input terminal connected with the signal line providing a second threshold, and its inverting input terminal connected to the output terminal of the signal processing module 421.

Figure 7D:
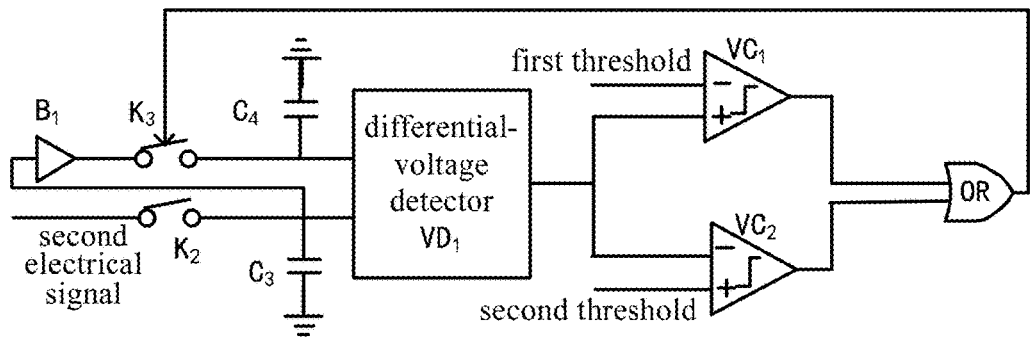

In the embodiment shown in FIG. 7D, the threshold comparison module comprises a differential-voltage detector $VD_1$, a third capacitor $C_3$, a fourth capacitor $C_4$, a first buffer $B_1$, an OR logic switch OR, a second switch $K_2$, a third switch $K_3$, a first voltage comparator $VC_1$, and a second voltage comparator $VC_2$. The differential-voltage detector $VD_1$ has its first input terminal connected with the third capacitor $C_3$ which acts as a pull-down capacitor, and its second input terminal connected with the fourth capacitor $C_4$ which also acts as a pull-down capacitor. The second switch $K_2$ is placed between the third capacitor $C_3$ and the output terminal of the signal processing module 421. The first buffer $B_1$ and the third switch $K_3$ are connected in series between the third capacitor $C_3$ and the fourth capacitor $C_4$. The first buffer $B_1$ can be implemented as a voltage follower but not limited thereto. The first voltage comparator $VC_1$ has its inverting input terminal connected with the signal line providing a first threshold, and its non-inverting input terminal connected to the output terminal of the voltage differential detector $VD_1$. The second voltage comparator $VC_2$ has its non-inverting input terminal connected with the signal line providing a second threshold, and its inverting input terminal connected to the output terminal of the voltage differential detector $VD_1$. The OR logic switch OR has its first input terminal coupled with the output terminal of the first voltage comparator $VC_1$, its second input terminal coupled with the output terminal of the second voltage comparator $VC_2$, and its output terminal coupled with the input terminal of the OR logic unit 430. In this way, the differential-voltage detector $VD_1$ can compare the second electrical signal at the first input terminal with the signal held at the second input terminal, and output a differential signal. When the output signal of the voltage differential detector $VD_1$ is greater than the first threshold or less than the second threshold, the threshold comparison module 422 outputs a first trigger signal through the OR logic switch OR. In addition, when outputting the first trigger signal, the threshold comparison module 422 starts performing the following operations in sequence: turns off the second switch $K_2$, turns on the third switch $K_3$, turns off the third switch $K_3$, turns on the second switch $K_2$. In this way, the threshold comparison module can update the signal held at the second input terminal to the instantaneous second electrical signal at the first input terminal.

The OR logic unit 430 has its input terminal coupled with the output terminal of the signal detection unit 420 and the global trigger signal line of the optical flow sensor. The OR logic unit 430 is operative to output an acquisition instruction signal upon receiving the first trigger signal or a global trigger signal from the global trigger signal line.

The acquisition control unit 440 has its input terminal coupled with the output terminal of the OR logic unit 430. Upon receiving the acquisition instruction signal from the OR logic unit 430, the acquisition control unit 440 is operative to output (and keep) an activation signal. In an embodiment of the invention, the acquisition control unit 440 can keep the activation signal until receiving a reset signal from the reset signal line. The acquisition control unit 440 can be configured as a latch. Accordingly, the set input terminal of the latch is coupled with the output terminal of the OR logic unit 430. The latch has its reset input terminal coupled with the reset signal line and its output terminal coupled with the third input terminal of the sample and hold unit 450 and the signal output unit 460.

Figure 8A:
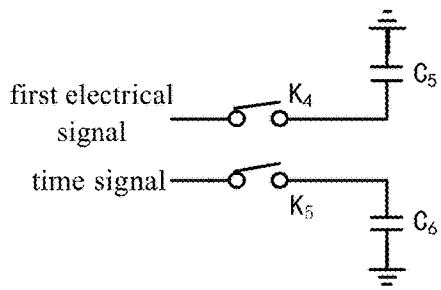
FIG. 8A and FIG. 8B respectively shows a schematic diagram of a sample and hold unit in accordance with an embodiment of the invention.
Figure 8B:
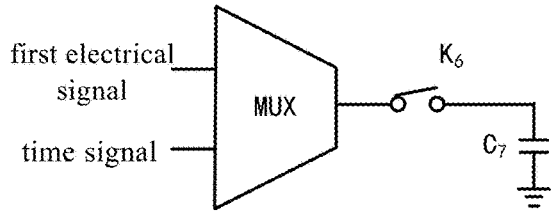
Figure 9A:
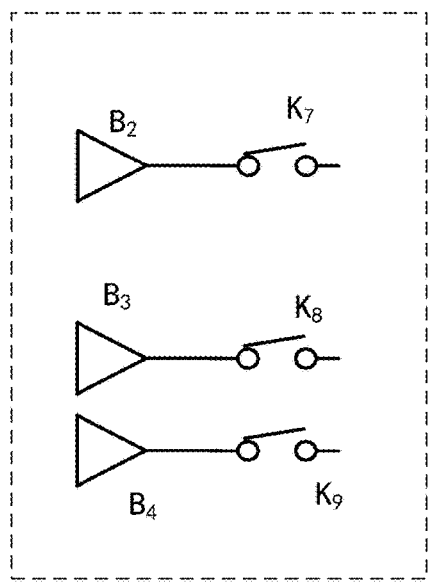
FIG. 9A and FIG. 9B respectively shows a schematic diagram of a signal output unit in accordance with an embodiment of the invention.
Figure 9B:
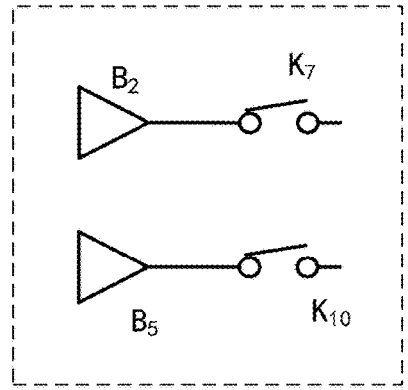

The sample and hold unit 450 has its first input terminal coupled with the output terminal of the photodetection unit 410, its second input terminal coupled with the time signal line, and its third input terminal coupled with the output terminal of the acquisition control unit 440. The sample and hold unit 450 is operative to sample and buffer the instantaneous first electrical signal and/or time signal at the moment of the arrival of the activation signal. The signal output unit 460 is coupled with both the acquisition control unit 440 and the sample and hold unit 450, and is operative buffer and output the activation signal and the first electrical signal and/or time signal most recently sampled by the sample and hold unit. FIGS. 8A and 8B respectively shows an embodiment of a sample and hold unit. FIG. 9A and FIG. 9B respectively shows a schematic diagram of a sample and hold unit in accordance with an embodiment of the invention.

In the embodiment shown in FIG. 8A, the sample and hold unit 450 comprises a fifth capacitor $C_5$, a fourth switch $K_4$, a sixth capacitor $C_6$, and a fifth switch $K_5$. The first terminal of the fifth capacitor $C_5$ is grounded. The fourth switch $K_4$ is connected between the second terminal of the fifth capacitor $C_5$ and the output terminal of the photodetection unit 410. The first terminal of the sixth capacitor $C_6$ is grounded. The fifth switch $K_5$ is connected between the second terminal of the sixth capacitor $C_6$ and the time signal line. The signal output unit 460 connected with this embodiment is configured as the implementation shown in FIG. 9A. The signal output unit 460 comprises a second buffer $B_2$, a seventh switch $K_7$, a third buffer $B_3$, an eighth switch $K_8$, a fourth buffer $B_4$, and a ninth switch $K_9$. The input terminal of the second buffer $B_2$ is coupled with the output terminal of the acquisition control unit 440. The seventh switch $K_7$ is connected between the output terminal of the second buffer $B_2$ and the trigger state output line. The input terminal of the third buffer $B_3$ is coupled with the second terminal of the fifth capacitor $C_5$. The eighth switch $K_8$ is connected between the output terminal of the third buffer $B_3$ and the first electrical signal output line. The input terminal of the fourth buffer $B_4$ is coupled with the second terminal of the sixth capacitor $C_6$. The ninth switch $K_9$ is connected between the output terminal of the fourth buffer $B_4$ and the time signal output line. Upon receiving the activation signal, the sample and hold unit 450 can switch off the fourth switch $K_4$ and the fifth switch $K_5$. In this way, the fifth capacitor $C_5$ can sample and buffer the instantaneous first electrical signal. The sixth capacitor $C_6$ can sample and buffer the instantaneous time signal. During readout, the signal output unit 460 can switch on the seventh switch $K_7$, the eighth switch $K_8$, and the ninth switch $K_9$ according to the control signal. For instance, the readout unit of the optical flow sensor sends a row select signal through the row selection line to the signal output unit 460, thus switching on the seventh switch $K_7$, the eighth switch $K_8$, and the ninth switch $K_9$. In this way, the signal output unit 460 can output the activation signal, the first electrical signal, and the time signal.

In the embodiment shown in FIG. 8B, the sample and hold unit 450 comprises a multiplexer MUX, a seventh capacitor $C_7$, and a sixth switch $K_6$. The MUX has its first input terminal connected to the output terminal of the photodetection unit 410, and its second input terminal connected to the time signal line. The first terminal of the seventh capacitor $C_7$ is grounded. The sixth switch $K_6$ is connected between the output terminal of the MUX and the second terminal of the seventh capacitor $C_7$. Accordingly, the signal output unit 460 is configured as the implementation shown in FIG. 9B. The signal output unit 460 comprises a second buffer $B_2$, a seventh switch $K_7$, a fifth buffer $B_5$, and a tenth switch $K_{10}$. The input terminal of the second buffer $B_2$ is coupled with the output terminal of the acquisition control unit 440. The seventh switch $K_7$ is connected between the output terminal of the second buffer $B_2$ and the trigger state output line. The input terminal of the fifth buffer $B_5$ is coupled with the second terminal of the seventh capacitor $C_7$. The tenth switch $K_{10}$ is connected between the output terminal of the fifth buffer $B_5$ and the signal output line. In this embodiment, the MUX can be configured to connect with either the photodetection unit or the waveform generator according to the instruction from the optical flow sensor. In image mode, normally, the global control unit of the optical flow sensor can instruct the MUX to connect to the photodetection unit. In optical mode, on the other hand, the global control unit can instruct the MUX to connect with the waveform generator. The control instructions can be transmitted, for instance, through dedicated or reused control signal lines from the global control unit, which will not be elaborated here.

Figure 10:
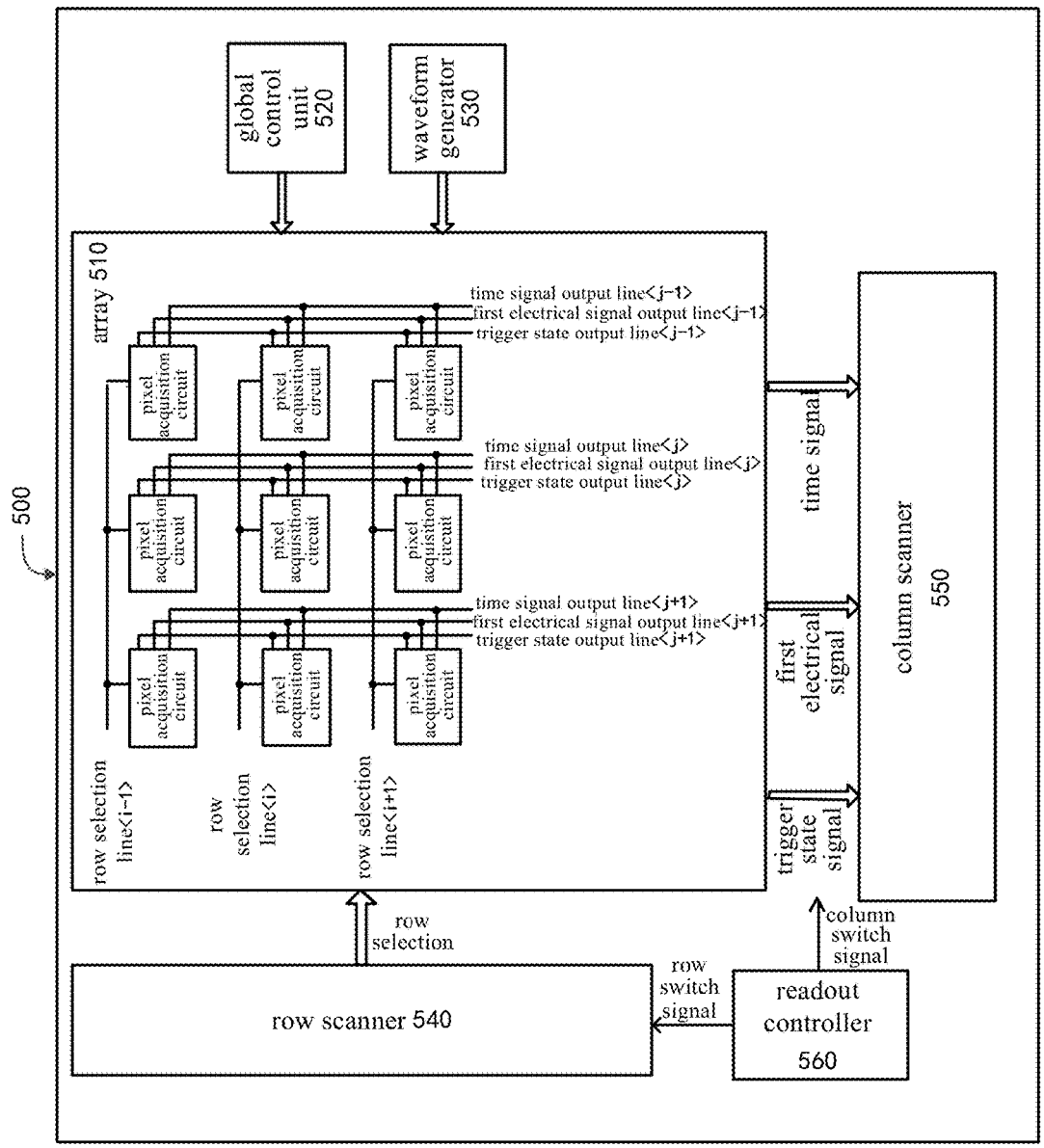
FIG. 10 shows a schematic diagram of an optical flow sensor 500 in accordance with some embodiments of the invention.

FIG. 10 shows a schematic diagram of an optical flow sensor 500 in accordance with some embodiments of the invention. As shown in FIG. 10, the optical flow sensor 500 comprises a pixel acquisition circuit array 510, a global control unit 520, a waveform generator 530, a row scanner 540, a column scanner 550, and a readout controller 560. Here, the row scanner 540, the column scanner 550 and the readout controller 560 constitute the readout unit. The waveform generator 530 is operative to output a periodic signal waveform to the time signal line coupled with each of the pixel acquisition circuits in the array. The global control unit 520 is operative to output the aforementioned global activation and reset signal to each pixel acquisition circuit through said global trigger signal line and reset signal line respectively. The readout unit is operative to read the signals output by at least a part of the pixel acquisition circuits in that array.

Figure 11:
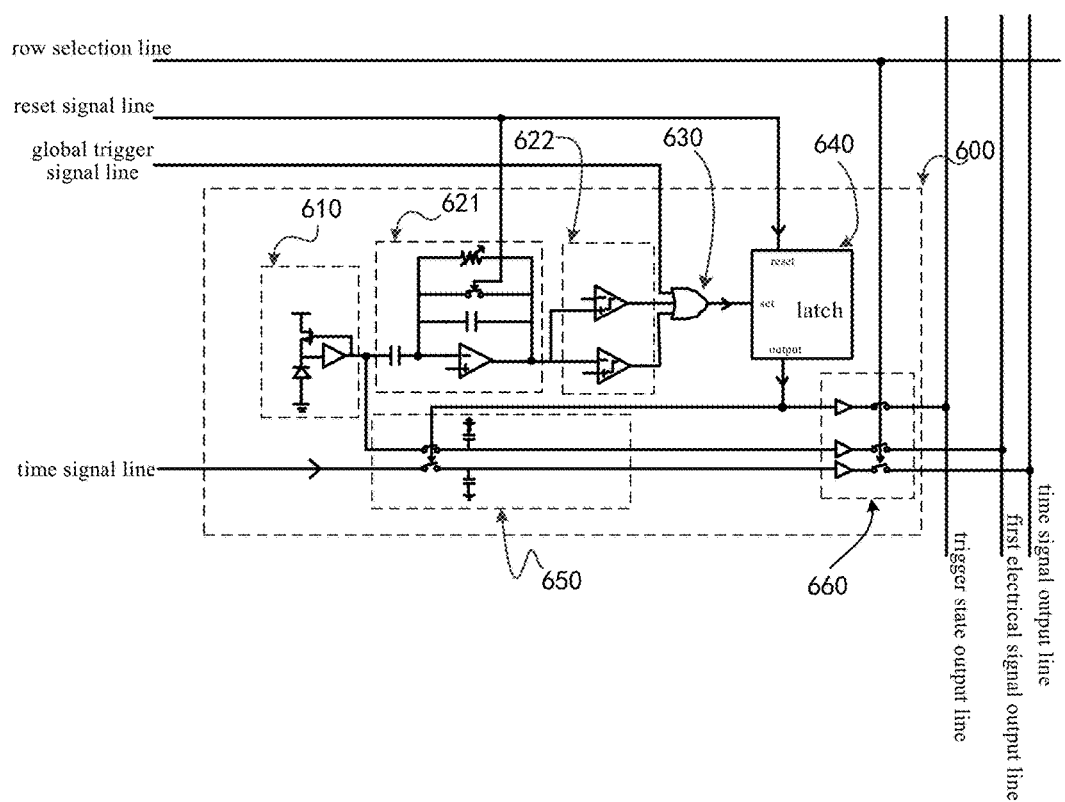
FIG. 11 shows a schematic diagram of one of the pixel acquisition circuits depicted in FIG. 10.

FIG. 10 shows a part of the pixel acquisition circuits in the array 510. This part of the pixel acquisition circuits can be divided by row into the i−1th row, the ith row, and the i+1th row, and can be divided by column into the j−1th column, the jth column, and the j+1th column. Take the pixel acquisition circuit in the ith row and the jth column for example, the output signal lines of each pixel acquisition circuit comprise one time signal output line, one first electrical signal output line, and one trigger state output line. FIG. 11 shows a schematic diagram of one of the pixel acquisition circuits depicted in FIG. 10.

In the embodiment shown in FIG. 11, the pixel acquisition circuit 600 comprises a photodetection unit 610, a signal detection unit, an OR logic unit 630, an acquisition control unit 640, a sample and hold unit 650, and a signal output unit 660. The photodetection unit 610 is configured as the implementation shown in FIG. 5B. In addition, the photodetection unit 610 can also be configured as the implementations shown in FIG. 5A, FIG. 5C, and FIG. 5D, which will not be elaborated here. The signal detection unit comprises a signal processing module 621 and a threshold comparison module 622. The signal processing module 621 is configured as the implementation shown in FIG. 6B. The threshold comparison module 622 is configured as the implementation shown in FIG. 7C. The sample and hold unit 650 is configured as the implementation shown in FIG. 8A. The signal output unit 660 is configured as the implementation shown in FIG. 9A.

The operating process of the optical flow sensor 500 will be further explained below in conjunction with FIG. 10 and FIG. 11. The global control unit 520 can control the frequency of information acquisition of the optical sensor through the reset signal. In fact, the time period between 2 adjacent reset signals corresponds to one frame (i.e., 1 acquisition time period). In other words, the global control unit 520 outputs one reset signal at a time, indicating the end of the last frame and the start of the new frame. Therefore, as to 2 adjacent reset signals, the first can be considered as a start reset signal, and the second can be considered as an end reset signal. For image frames following the start reset signal, a global trigger signal is sent by the global control unit 520 through the global trigger signal line to all the pixel acquisition circuits, which activates all the pixel acquisition circuits to sample an image frame. For optical flow frames, the global control unit 520 will not output the global trigger signal between the start and end reset signals. In this way, based on the relevant detected light intensity change, the pixel acquisition circuits in the array 510 can decide whether to be activated and acquire the optical flow frame.

In image mode, the readout controller 560 can instruct the row scanner to select a row of pixel acquisition circuits in sequence. As for any row of pixel acquisition circuits, the row scanner can output a control signal through the row selection line to turn on the switches in the output signal units of all the pixel acquisition circuits in this row. On this basis, the readout controller 560 can instruct the column scanner to read the first electrical signal of each pixel acquisition circuit in that row one by one. On the other hand, depending on the specific data requirement, the column scanner can also be configured to read the time signal sampled by each pixel acquisition circuit.

In optical flow mode, the row scanner operates in the same way as in the image mode. The column scanner can be configured to read the time signal and trigger state signal of each pixel acquisition circuit one by one. In this way, the time signals of the pixel acquisition circuits that are in triggered state can be extracted from the optical flow frame read by the column scanner. The extracted time signals can provide the optical flow information of the moving object.

In another embodiment, aside from the ways of operation described above, the readout unit can also be configured to directly read the time signals of the triggered pixel acquisition circuits, while eliminates the first electrical signals or the trigger state signals under optical flow mode. In particular, the column scanner can also be configured to comprise a trigger state monitoring module (not shown in FIG. 10). Each time the column scanner scans one row of pixel acquisition circuits, the trigger state monitoring module controls the column scanner to first recognize all the triggered pixel acquisition circuits (by means of their triggered state) and then scan their sampled time signal out of the sensor one by one. In addition, in this embodiment, the row scanner further comprises a row address encoding module. Accordingly, the column scanner further comprises a column address encoding module. In this way, the readout unit can output the time signal (of the triggered pixel acquisition circuit) together with their address information.

What needs to be further explained is that aside from the configuration of the signal output lines shown in FIG. 10, it can also be configured to comprise one signal output line and one trigger state output line. Accordingly, the sample and hold unit in each pixel acquisition circuit can be configured as the implementation shown in FIG. 8B. The signal output unit is configured as the implementation shown in FIG. 9B. In addition, the photodetection unit 610 can also be configured as the implementations shown in FIG. 5A, FIG. 5C, and FIG. 5D. The signal processing module 621 can be configured as the implementations shown in FIG. 6A, FIG. 6C, and FIG. 6D. The threshold comparison module 622 can be configured as the implementations shown in FIG. 7A, FIG. 7B, and FIG. 7D, which will not be elaborated here.

In summary, the optical flow sensor in accordance with the invention can instruct the pixel acquisition circuit array to operate under image mode or optical flow mode through the global control unit. Under image mode, the whole pixel acquisition circuit array is configured to acquire a full image. Especially in some application scenarios demanding high-speed photography, the optical flow sensor in accordance with the invention is capable of capturing sharp and lag-free images thanks to the elimination of the exposure time. In this way, images acquired by the optical flow sensor can provide full background information for subsequent optical flow frames. Under optical flow mode, each pixel acquisition circuit continuously responds to local light intensity and determines whether to be activated based on the detected light intensity change. In this way, each pixel acquisition circuit of the invention can individually acquire the time signal relating to the optical flow information of a moving object, that is, to acquire an optical flow frame. On this basis, the motion trajectory of a target object can be clearly characterized by multiple frames of time signals and corresponding address information acquired by the optical flow sensor of the invention. In summary, the optical flow sensor of the invention can provide clear and straightforward optical flow information, thus greatly reducing redundant information, and furthermore can reduce the computational complexity of subsequent optical flow algorithms and enhance the real-timeness of optical flow calculations.

A16. The pixel acquisition circuit as set forth by A8, wherein, said threshold comparison module comprises: a second voltage comparator ($VC_2$), its non-inverting input terminal connected with the signal line providing said second threshold, and its inverting input terminal connected to the output terminal of said signal processing module. A17. The pixel acquisition circuit as set forth by A8, wherein, said threshold comparison module comprises: a first voltage comparator ($VC_1$), its inverting input terminal connected with the signal line providing said first threshold, and its non-inverting input terminal connected to the output terminal of said signal processing module; a second voltage comparator ($VC_2$), its non-inverting input terminal connected with the signal line providing said second threshold, and its inverting input terminal connected to the output terminal of said signal processing module. A18. The pixel acquisition circuit as set forth by A8, wherein, said threshold comparison module comprises: a differential-voltage detector ($VD_1$), its first input terminal connected with a third capacitor ($C_3$) which acts as a pull-down capacitor and its second input terminal connected with a fourth capacitor ($C_4$) which also acts as a pull-down capacitor, and operative to output a differential signal between the first input terminal and the second input terminal; a second switch ($K_2$) placed between the third capacitor ($C_3$) and the output terminal of said signal processing module; a first buffer ($B_1$) and a third switch ($K_3$) in turn connected in series between the third capacitor ($C_3$) and the fourth capacitor ($C_4$); a first voltage comparator ($VC_1$), its inverting input terminal connected with the signal line providing said first threshold, and its non-inverting input terminal connected to the output terminal of the voltage differential detector; a second voltage comparator ($VC_2$) its non-inverting input terminal connected with the signal line providing said second threshold, and its inverting input terminal connected to the output terminal of the voltage differential detector; an OR logic switch (OR), its first input terminal coupled with the output terminal of the first voltage comparator, its second input terminal coupled with the output terminal of the second voltage comparator, and its output terminal coupled with the input terminal of said OR logic unit, wherein, when the differential signal output by said differential-voltage detector is greater than the first threshold or less than the second threshold, that threshold comparison module outputs said first trigger signal, and switches off the second switch ($K_2$), then switches on the third switch ($K_3$), then switches off the third switch ($K_3$), and then switches on the second switch ($K_2$), successively in time. A19. The pixel acquisition circuit as set forth by A1, wherein, said acquisition control unit is configured as a latch, its set input terminal coupled with the output terminal of said OR logic unit, its reset input terminal coupled with said reset signal line, and its output terminal coupled with both the third input terminal of said sample and hold unit and said signal output unit. A20. The pixel acquisition circuit as set forth by A3, wherein, said sample and hold unit comprises: a fifth capacitor ($C_5$), its first terminal grounded; a fourth switch ($K_4$) connected between the second terminal of the fifth capacitor ($C_5$) and the output terminal of said photodetection unit; a sixth capacitor ($C_6$), its first terminal grounded; and a fifth switch ($K_5$) connected between the second terminal of the sixth capacitor ($C_6$) and said time signal line. A21. The pixel acquisition circuit as set forth by A20, wherein, said signal output unit comprises: a second buffer ($B_2$), its input terminal coupled with the output terminal of said acquisition control unit; a seventh switch ($K_7$) connected between the output terminal of the second buffer ($B_2$) and the trigger state output line; a third buffer ($B_3$), its input terminal coupled with the second terminal of said fifth capacitor ($C_5$); an eighth switch ($K_8$) connected between the output terminal of the third buffer ($B_3$) and the first electrical signal output line; a fourth buffer ($B_4$), its input terminal coupled with the second terminal of said sixth capacitor ($C_6$); and a ninth switch ($K_9$) connected between the output terminal of the fourth buffer ($B_4$) and said time signal output line. A22. The pixel acquisition circuit as set forth by A3, wherein, said sample and hold unit comprises: a multiplexer (MUX), its first input terminal connected to the output terminal of said photodetection unit, and its second input terminal connected to said time signal line; a seventh capacitor ($C_7$), its first terminal grounded; and a sixth switch ($K_6$) connected between the output terminal of said multiplexer (MUX) and the second terminal of the seventh capacitor ($C_7$). A23. The pixel acquisition circuit as set forth by A22, wherein, said signal output unit comprises: a second buffer ($B_2$), its input terminal coupled with the output terminal of said acquisition control unit; a seventh switch ($K_7$) connected between the output terminal of the second buffer ($B_2$) and the trigger state output line; a fifth buffer ($B_5$), its input terminal coupled with the second terminal of the seventh capacitor ($C_7$); and a tenth switch ($K_{10}$) connected between the output terminal of the fifth buffer ($B_5$) and the signal output line.

B28. The optical flow sensor as set forth by B27, wherein, said row scanner is further operative to output the row address; said column scanner is further operative to output the column address of each read pixel acquisition circuit.

Numerous specific details have been explained in the specification provided herein. However, it should be understood that the embodiments of the invention can be practiced without these specific details. In some instances, the methods, structures, and techniques well-known in the art are not shown in detail, in order to avoid obscuring the understanding of the specification.

Similarly, it should be understood that in order to make the disclosure concise and to help understand one or more aspects of the invention, in the foregoing description of the exemplary embodiments of the invention, various features of the invention sometimes have been grouped into a single embodiment, drawing, or description thereof. However, this method of disclosure should not be construed as reflecting the following intention: the claimed invention requires more features than specifically recited in each of the claims. To be more precise, as reflected in the following claims, the inventive aspect lies in less than all the features of a single embodiment disclosed above. Therefore, the claims complying with a specific implementation are hereby specifically incorporated into that specific implementation, wherein each claim itself being an individual embodiment of the invention.

It should be understood by those skilled in the art that the modules or elements or components of a device in an example disclosed herein can be disposed on the device as described in that embodiment, or alternatively can be located on one or more devices that are different from the device in that example. The modules in the foregoing example can be combined into one module, or can further be divided into multiple sub-modules.

It could be understood by those skilled in the art that the modules of a device in an embodiment can be adaptively changed, and can be arranged on one or more devices that are different from the device in that embodiment. The modules or elements of components in the embodiment can be combined into one module or element or component, and can further be divided into multiple sub-modules or sub-elements or sub-components. Unless at least some of the features and/or procedures or elements are mutually exclusive, all the features disclosed in the specification (including the accompanying claims, abstract and drawings) and all the procedures or elements of any method or device hereby disclosed can be combined in any combination. Unless otherwise stated specifically, each feature disclosed in the specification (including the accompanying claims, abstract and drawings) can be substituted with an alternative feature that achieves the same, equivalent, or similar objective.

In addition, it could be understood by those skilled in the art that despite the fact that some embodiments described herein include certain but not other features included in other embodiments, combinations of features from different embodiments are intended to fall into the scope of the invention and form different embodiments. For example, in the following claims, any of the claimed embodiments can be combined to use in any combination.

In addition, some of the described embodiments have been described as a combination of method or method element that can be implemented by a processor of the computer system or other apparatus carrying out said functions. Therefore, the processor with necessary instructions for carrying out said method or method element becomes the apparatus for carrying out that method or method element. In addition, the element of an apparatus embodiment described herein is the following example of an apparatus: that apparatus is to perform the functions carried out by the element for achieving that objective of the invention.

Unless otherwise specified, the ordinal terms, such as "first", "second", "third", etc., used herein for describing normal objects only represent different instances relating to the similar objects, and do not intend to imply that the described objects must have certain order in terms of time, space, ranking, or any other aspect.

Although the invention has been described according to a limited number of embodiments, it will be appreciated by those skilled in the art benefiting from the foregoing description that other embodiments can be conceived within the scope of the invention hereby described. In addition, it should be noticed that the language used in the specification has been chosen for the purposes of readability and teaching, and not for explaining or defining the subject matter of the invention. Therefore, a lot of modifications and alterations will become apparent to those having ordinary skills in the art without departing from the scope and spirit of the appended claims. As for the scope of the invention, the disclosure of the invention intends to be illustrative and not limiting, and the scope of the invention is defined by the appended claim.

The invention claimed is:

1. A pixel acquisition circuit of an optical flow sensor, comprising:
   a photodetection unit operative to output a first electrical signal responding to the incident light intensity in real time;
   a signal detection unit with its input terminal coupled with the output terminal of the photodetection unit, and operative to output a first trigger signal when detecting that the first electrical signal meets predetermined trigger conditions;
   an OR logic unit with its input terminal coupled with both the output terminal of the signal detection unit and a global trigger signal line of the optical flow sensor, and operative to output an acquisition instruction signal when receiving the first trigger signal or a global trigger signal from the global trigger signal line;
   an acquisition control unit with its input terminal coupled with the output terminal of the OR logic unit, and operative to output and keep an activation signal when receiving the acquisition instruction signal;
   a sample and hold unit with its first input terminal coupled with the output terminal of the photodetection unit, its second input terminal coupled with a time signal line, and its third input terminal coupled with the output terminal of the acquisition control unit, and operative to receive the activation signal, and sample and buffer the first electrical signal and/or time signal at the moment of the receiving of the activation signal; and
   a signal output unit being coupled with both the acquisition control unit and the sample and hold unit, and operative to buffer and output the activation signal and the first electrical signal and/or time signal most recently sampled by the sample and hold unit.

2. The pixel acquisition circuit as claimed in claim 1, wherein, said acquisition control unit is connected with a reset signal line, and operative to revoke said activation signal when receiving a reset signal from the reset signal line.

3. The pixel acquisition circuit as claimed in claim 1, wherein, said time signal line is operative to transmit a periodic signal waveform to said sample and hold unit;
   the time signal sampled by said sample and hold unit is the amplitude signal of that periodic signal waveform at the present acquisition instant in time.

4. The pixel acquisition circuit as claimed in claim 1, wherein, said photodetection unit comprises:
   a photodiode ($PD_1$) with its anode grounded;

a first transistor ($T_1$) with its source connected with the cathode of the photodiode ($PD_1$) and its drain and gate connected to the power supply (VDD).

5. The pixel acquisition circuit as claimed in claim 1, wherein, said photodetection unit comprises:
a photodiode ($PD_1$) with its anode grounded;
a first transistor ($T_1$) with its source connected with the cathode of the photodiode ($PD_1$) and its drain connected with the power supply (VDD);
a first amplifier ($A_1$) connected between the cathode of the photodiode ($PD_1$) and the gate of the first transistor ($T_1$).

6. The pixel acquisition circuit as claimed in claim 1, wherein, said photodetection unit comprises:
a photodiode ($PD_1$) with its anode grounded;
N transistors connected in series, wherein, N≥2, the source of the 1st transistor is connected with the cathode of the photodiode ($PD_1$), the drain of the Nth transistor is connected to the power supply (VDD), each transistor has its gate and drain connected together, and the source of each of the 2nd to the Nth transistors is connected to the drain of the previous transistor.

7. The pixel acquisition circuit as claimed in claim 1, wherein, said photodetection unit comprises:
a photodiode ($PD_1$) with its anode grounded;
N transistors connected in series, wherein, N≥2, the source of the 1st transistor is connected with the cathode of the photodiode ($PD_1$), the drain of the Nth transistor is connected to the power supply (VDD), the source of each of the 2nd to the Nth transistors is connected to the drain of the previous transistor, and each of the 2nd to the Nth transistors has its gate and drain connected together;
a first amplifier ($A_1$) connected between the cathode of the photodiode ($PD_1$) and the gate of the 1st transistor.

8. The pixel acquisition circuit as claimed in claim 1, wherein, said signal detection unit comprises:
a signal processing module operative to perform a high-pass filtering process on said first electrical signal in order to obtain a corresponding second electrical signal;
a threshold comparison module operative to output said first trigger signal when determining that the second electrical signal is greater than a first threshold or less than a second threshold.

9. The pixel acquisition circuit as claimed in claim 1, wherein, said signal detection unit comprises:
a signal processing module operative to perform an amplification process and a high-pass filtering process on said first electrical signal in order to obtain a corresponding second electrical signal;
a threshold comparison module operative to output said first trigger signal when determining that the second electrical signal is greater than a first threshold or less than a second threshold.

10. The pixel acquisition circuit as claimed in claim 9, wherein, said signal processing module comprises:
a second amplifier ($A_2$) with its positive input electrode connected to the output terminal of said photodetection unit and its negative input electrode connected with a first resistor ($R_1$) which acts as a pull-down resistor, with a second resistor ($R_2$) connected between its output terminal and negative input electrode, and operative to perform said amplification process on the first electrical signal output by said photodetection unit;
a high-pass filter connected to that second amplifier ($A_2$), and operative to filter out the signal component below a frequency threshold in the amplified first electrical signal, so as to output said second electrical signal.

11. The pixel acquisition circuit as claimed in claim 9, wherein, said signal processing module comprises:
a first capacitor ($C_1$) with its first terminal connected with the output terminal of said photodetection unit;
a second amplifier ($A_2$) with its positive input electrode connected to a fixed potential and its negative input electrode connected with the second terminal of the first capacitor ($C_1$),
a second capacitor ($C_2$), a third resistor ($R_3$), and a first switch ($K_1$) all connected in parallel across the negative input electrode and output terminal of the second amplifier ($A_2$),
wherein, while said reset signal line holds the reset signal, the first switch ($K_1$) is closed.

12. The pixel acquisition circuit as claimed in claim 11, wherein, said third resistor is an adjustable resistor.

13. The pixel acquisition circuit as claimed in claim 9, wherein, said signal processing module comprises:
a second amplifier ($A_2$) with its positive input electrode connected with the output terminal of said photodetection unit;
a first capacitor ($C_1$) with its first terminal connected with the negative input electrode of the second amplifier ($A_2$) and its second terminal connected to a fixed potential;
a first switch ($K_1$) connected between the first terminal of the first capacitor ($C_1$) and the output terminal of said photodetection unit; and
a high-pass filter connected to that second amplifier ($A_2$), and operative to filter out the signal component below a predetermined frequency threshold in the amplified first electrical signal, so as to generate said second electrical signal,
wherein, while said reset signal line holds the reset signal, the first switch ($K_1$) is switched on.

14. The pixel acquisition circuit as claimed in claim 9, wherein, said signal processing module comprises:
a first capacitor ($C_1$) with its first terminal connected with the output terminal of said photodetection unit;
a current replicator ($P_1$) with its first terminal connected with the second terminal of the first capacitor ($C_1$);
a second amplifier ($A_2$) with its input positive electrode connected to a fixed potential and its input negative electrode connected with the second terminal of the current replicator ($P_1$);
a second capacitor ($C_2$), a first switch ($K_1$), and a third resistor ($R_3$) all connected in parallel between the negative input electrode and output terminal of the second amplifier ($A_2$),
wherein, while said reset signal line holds the reset signal, the first switch ($K_1$) is switched on.

15. The pixel acquisition circuit as claimed in claim 8, wherein, said threshold comparison module comprises:
a first voltage comparator ($VC_1$) with its inverting input terminal connected with the signal line providing said first threshold and its non-inverting input terminal connected to the output terminal of said signal processing module.

16. An optical flow sensor, comprising:
a pixel acquisition circuit array comprising a plurality of pixel acquisition circuits as claimed in claim 15;

a waveform generator operative to output a periodic signal waveform to the time signal line coupled with each of the pixel acquisition circuits in the array;

a global control unit operative to output said global activation signal to each pixel acquisition circuit through the global trigger signal line, and output a reset signal to each pixel acquisition circuit through said reset signal line;

a readout unit operative to read the signals output by at least a part of the pixel acquisition circuits in that array.

17. The optical flow sensor as claimed in claim 16, wherein, said global control unit is operative to:

configure the operation mode of said pixel acquisition circuit array in each sampling time period, that operation mode including optical flow mode and image mode;

when the current sampling time period is configured in image mode, output said reset signal and said global trigger signal in that sampling time period in sequence, in order for that pixel acquisition circuit array to be globally activated and for the first electrical signal of each pixel acquisition circuit to be read by said readout unit;

when the current sampling time period is configured in optical flow mode, output said reset signal at the starting point of time of that sampling time period, in order for the time signal to be acquired by the pixel acquisition circuits meeting said predetermined trigger conditions and to be read by said readout unit.

18. The optical flow sensor as claimed in claim 16, wherein, said readout unit comprises:

a row scanner;

a column scanner;

a readout controller operative to instruct the row scanner to select one row of pixel acquisition circuits in sequence, and when one row is selected by the row scanner, instruct the column scanner to read the signals output by at least a part of the pixel acquisition circuits in that row one by one.

19. The optical flow sensor as claimed in claim 16, wherein, said readout unit comprises:

a row scanner;

a column scanner;

a readout controller operative to instruct the row scanner to select one row of pixel acquisition circuits in sequence, and when one row is selected by the row scanner, instruct the column scanner to read the signals output only by the pixel acquisition circuits that are in activated state.

20. An image acquisition system, comprising:

an optical flow sensor as claimed in claim 19;

an image pre-processor operative to obtain information from the optical flow sensor under image mode; and an optical flow pre-processor operative to obtain information from the optical flow sensor under optical flow mode.

* * * * *